United States Patent
Blanchard et al.

(10) Patent No.: US 9,290,414 B2
(45) Date of Patent: Mar. 22, 2016

(54) GLASS STRAND PROVIDED WITH A POLYMER-BASED COATING AND SCREEN COMPRISING SAID STRAND

(75) Inventors: Benjamin Blanchard, Taverny (FR); Katarzyna Chuda, Villejuif (FR)

(73) Assignee: SAINT-GOBAIN ADFORS, Chambery (FR)

( * ) Notice: Subject to any disclaimer, the term of this patent is extended or adjusted under 35 U.S.C. 154(b) by 0 days.

(21) Appl. No.: 14/008,827

(22) PCT Filed: Mar. 28, 2012

(86) PCT No.: PCT/FR2012/050654
§ 371 (c)(1),
(2), (4) Date: Sep. 30, 2013

(87) PCT Pub. No.: WO2012/131255
PCT Pub. Date: Oct. 4, 2012

(65) Prior Publication Data
US 2014/0017471 A1    Jan. 16, 2014

(30) Foreign Application Priority Data

Mar. 30, 2011    (FR) ...................................... 11 52636

(51) Int. Cl.
| | |
|---|---|
| *C03C 25/28* | (2006.01) |
| *C03C 25/24* | (2006.01) |
| *C03C 25/26* | (2006.01) |
| *C03C 25/30* | (2006.01) |
| *C03C 25/40* | (2006.01) |
| *C03C 25/54* | (2006.01) |

(52) U.S. Cl.
CPC ................. *C03C 25/28* (2013.01); *C03C 25/24* (2013.01); *C03C 25/26* (2013.01); *C03C 25/30* (2013.01); *C03C 25/40* (2013.01); *C03C 25/54* (2013.01); *Y10T 428/2949* (2015.01); *Y10T 428/2962* (2015.01); *Y10T 442/10* (2015.04); *Y10T 442/133* (2015.04)

(58) Field of Classification Search
CPC ..................... C03C 17/42; C03C 25/24–25/54
USPC .......................... 428/391, 219, 384; 422/1, 20
See application file for complete search history.

(56) References Cited

U.S. PATENT DOCUMENTS

| | | | | |
|---|---|---|---|---|
| 2,688,007 | A | * | 8/1954 | Steinman ................ C03C 25/26 106/278 |
| 3,067,059 | A | * | 12/1962 | Jannarelli et al. ............. 424/412 |
| 3,702,783 | A | * | 11/1972 | Hartlein ........................ 427/215 |
| 3,922,466 | A | | 11/1975 | Bell et al. |
| 3,993,837 | A | | 11/1976 | Foley et al. |
| 5,646,207 | A | | 7/1997 | Schell |
| 6,207,737 | B1 | | 3/2001 | Schell |
| 2002/0055313 | A1 | * | 5/2002 | Velpari et al. .................. 442/180 |
| 2004/0224147 | A1 | * | 11/2004 | Chou ............................ 428/331 |
| 2005/0265685 | A1 | * | 12/2005 | Ohashi et al. .................. 385/147 |
| 2007/0166226 | A1 | * | 7/2007 | Holmes et al. ................ 423/659 |
| 2008/0292739 | A1 | | 11/2008 | Kashikar et al. |

FOREIGN PATENT DOCUMENTS

| | | | |
|---|---|---|---|
| EP | 0 170 981 A1 | 2/1986 | |
| EP | 0170981 A1 * | 12/1986 | ............ D06M 15/72 |
| EP | 0170981 A1 * | 12/1986 | ............ D06M 15/72 |
| JP | 2008-105918 * | 5/2008 | ............. C01B 33/18 |
| WO | WO2009/140482 * | 11/2009 | ............... C09D 1/00 |

OTHER PUBLICATIONS

English translation of abstract of JP2008-105918 via East.*

* cited by examiner

*Primary Examiner* — Aaron Austin
*Assistant Examiner* — Laura Figg
(74) *Attorney, Agent, or Firm* — Oblon, McClelland, Maier & Neustadt, L.L.P.

(57) ABSTRACT

The present invention relates to a glass strand having a coating including a polymer chosen from vinyl acetate/vinyl chloride copolymers, polyvinyl chloride and polyvinylidene chloride, and a silane of formula (I).

20 Claims, No Drawings

GLASS STRAND PROVIDED WITH A POLYMER-BASED COATING AND SCREEN COMPRISING SAID STRAND

CROSS REFERENCE TO RELATED APPLICATIONS

The present application is a 35 U.S.C. §371 national stage patent application of International patent application PCT/FR2012/050654, filed on Mar. 28, 2012, published as WO 2012/131255 on Oct. 4, 2012, the text of which is incorporated by reference, and claims the benefit of the filing date of French application no. 1152636, filed on Mar. 30, 2011, the text of which is also incorporated by reference.

The invention relates to a glass strand provided with a polymer-based coating which is intended for the manufacture of a screen, particularly in the form of a grid, woven fabric or knitted fabric which can be used in particular as a mosquito net.

Screens comprising a network of strands are generally positioned in windows and doors in order to prevent insects from entering dwellings. The size of the meshes in the network is appropriate for retaining insects, in particular mosquitoes, without opposing the passage of air and light.

Such screens are generally manufactured from a strand comprising a polymer-based coating, for example polyvinyl chloride (PVC): the strand is assembled in the form which is suitable (grid, woven fabric or knitted fabric) and then the assembled part is treated in a heated chamber at a temperature which allows the polymer to melt and is cooled to ambient temperature, resulting in the solidification of the polymer and the bonding of the strands at their crossing points.

The screens can also be obtained by producing an assembled part formed of strands (grid, woven fabric or knitted fabric), by then treating it with a polymer-based coating composition and, finally, by subjecting it to a heat treatment as described above for the purpose of bonding the strands at the crossing points.

However, dust and soiling substances originating from the surrounding environment have a tendency to stick to these screens, completely or partially blocking the meshes, which makes it necessary to regularly clean the screen.

Solutions are known for limiting the clogging of mosquito nets and thus reducing the number of cleaning operations for a given period.

A solution described in CN-Y-2237104 consists in incorporating the screen in a frame and in combining it with mechanical cleaning means, such as brushes.

US-A1-2004/0224147 has provided a self-cleaning screen existing in the form of a meshwork of strands comprising a coating including either titanium oxide particles having a photocatalytic activity or nanoparticles which confer a low surface energy on the screen (the surface is said to be "superhydrophobic").

FR-A1-2 908 137 also teaches a process for the treatment of an organic surface, for example made of PVC, targeted at forming a barrier layer above which occurs a photocatalytic layer based on titanium oxide. The process is carried out at atmospheric pressure, in the presence of an ionized gas which makes possible the formation of a layer, in particular of $SiO_2$, exhibiting better adhesion to the layer based on titanium oxide.

The aim of the present invention is to obtain a glass strand coated with a polymer-based layer which makes possible in particular the manufacture of screens exhibiting an improved resistance to soiling substances.

This aim is achieved by adding, to the polymer forming the coating layer, a silane of following formula (I):

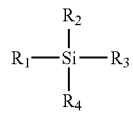

in which:
$R_1$, $R_2$ and $R_3$, which are identical or different, represent:
- a $C_1$-$C_6$ alkyl group,
- a $C_2$-$C_6$ alkenyl group,
- a $C_2$-$C_6$ alkynyl group,
- a $C_6$-$C_{10}$ aryl group,
- a hydroxyl group,
- a $C_1$-$C_6$ alkoxy group,
- a $C_6$-$C_{10}$ aryloxy group,
- a $C_1$-$C_6$ acyloxy group,
- a $C_2$-$C_7$ alkylcarbonyl group, at least two of the $R_1$, $R_2$ and $R_3$ groups representing a hydroxyl group or an alkoxy group, and $R_4$ represents:
- a group including at least one epoxy functional group,
- an optionally substituted aryl group,
- a halogen atom or a group carrying at least one halogen atom, in particular a fluorine atom,
- a group including at least one aldehyde functional group,
- a group carrying at least one functional group including a sulfur or phosphorus atom,
- an acryloyloxy or methacryloyloxy group, said group carrying the abovementioned functional groups being a $C_1$-$C_{18}$, preferably $C_1$-$C_8$, carbon-based group which can comprise at least one oxygen or sulfur heteroatom.

Preferably, the $R_1$, $R_2$ and $R_3$ groups are chosen from the methyl, ethyl, methoxy and ethoxy groups.

Preferably again, the $R_4$ group is:
- a group carrying at least one epoxy functional group in the end position, in particular a glycidoxyalkyl group in which the alkylene radical includes from 1 to 8 carbon atoms, advantageously glycidoxypropyl,
- an aryl group, in particular a phenyl group,
- a halogen atom or an aliphatic chain including from 1 to 9 carbon atoms carrying at least one halogen atom, in particular a fluorine atom.

The silane which is particularly preferred is 3-glycidoxypropylmethyldimethoxysilane, 3-glycidoxypropyltrimethoxysilane, phenyltriethoxysilane and triethoxyfluorosilane.

The polymer participating in the composition of the coating is a thermoplastic polymer optionally having an elastomeric nature. Mention may be made, as examples, of polyolefins, such as polyethylene and polypropylene, vinyl polymers, such as polyvinyl acetate, vinyl acetate/vinyl chloride copolymers, polyvinyl chloride or polyvinylidene chloride, and (meth)acrylic polymers. Polyvinyl chloride is preferred.

If appropriate, a plasticizer can be used to confer greater flexibility on the abovementioned polymer. The plasticizer is generally chosen from organic acid esters, preferably comprising at least two carboxyl groups, for example alkyl and/or aryl phthalates and alkyl adipates, phosphates and vegetable oils, in particular soybean oil or castor oil, or oils resulting from petroleum fractions, in particular paraffinic, aromatic or naphthenic fractions.

The preferred plasticizers for combining with PVC are alkyl and/or aryl phthalates, for example di(2-ethylhexyl) phthalate, dibutyl phthalate, dioctyl phthalate, diphenyl phthalate and benzyl butyl phthalate, alkyl adipates, for example di(2-ethylhexyl) adipate, dibutyl adipate and dioctyl adipate, and phosphates.

The mixture of the polymer and plasticizer is provided in the form of a plastisol or of a paste.

The mixture of polymer, silane and optionally plasticizer can additionally comprise conventional additives, for example heat stabilizers, lubricants, flame retardants, organic and/or inorganic pigments, slip agents, such as silicones, and UV inhibitors, which make it possible to protect the polymer from light radiation.

The strand provided with a polymer-based coating according to the invention can be used as is to manufacture screens, for example in the form of grids, woven fabrics or knitted fabrics.

The strand can additionally comprise at least one additional layer which is superimposed on the abovementioned polymer layer, which additional layer makes it possible to confer specific properties on the strand.

Mention may be made, as examples of such layers, of:
photocatalytic layers which comprise $TiO_2$ particles in anatase form, generally in a matrix of mesoporous silica. Generally, a barrier sublayer, in particular made of silica, is combined with the photocatalytic layer positioned between the PVC layer and said photocatalytic layer, in order to prevent damage to the PVC by the $TiO_2$ particles,
antistatic layers, obtained in particular by the sol/gel route, for example ITO (indium/tin oxide) layers, $SnO_2$ layers doped with a metal, in particular Sb, Nb, Ta or W, and ZnO layers which are or are not doped with Sn, Al, In, Y, Zr or B, and also layers based on a UV-crosslinkable or heat-crosslinkable polymer matrix comprising ITO nanoparticles,
hydrophilic layers, in particular based on silica, deposited by the sol/gel route or by atmospheric plasma, as described, for example, in FR 2 908 137 A1,
hydrophobic and/or oleophobic layers, in particular composed of a matrix (in the form of a layer or of beads) of silica grafted with fluorinated compounds, in particular trialkoxyfluoroalkylsilanes, alkylsilanes, arylsilanes or hexaalkyldisilazanes.

The amount of polymer-based coating deposited on the glass strand generally represents from 15 to 80% of the total weight of the coated strand, preferably from 50 to 70% and advantageously from 55 to 65%.

The amount of silane deposited on the glass strand represents from 0.5 to 15% of the total weight of the coating, preferably from 1 to 10% and advantageously from 3 to 7%.

The strand in accordance with the invention is obtained by applying a composition including the polymer and the silane to a glass strand including a plurality of glass filaments.

The glass strand in accordance with the invention is a strand composed of a multitude of glass filaments (or base strand) or a strand obtained by assembling several base strands into rovings, a comingled strand composed of glass filaments and of thermoplastic filaments which are intimately mixed or a mixed strand composed of glass strands and of thermoplastic strands which are assembled. The base strand and the strands composed of glass filaments and polyester filaments are preferred. In the abovementioned strands, the glass filaments are conventionally coated with a size applied to the latter during the drawing thereof and before assembling together thereof in the form of one or more strands. The size makes it possible in particular to protect the filaments from the risks of abrasion when they are in contact with the various members necessary to manufacture the strand, and also to bond the filaments together.

The abovementioned strand can be a twist-free yarn or a twisted yarn, for example with a twist of 0.4 to 1 turn per centimeter.

The glass participating in the composition of the strands can be of any type, for example E, C, R or AR (alkali-resistant). E Glass is preferred.

The diameter of the glass filaments making up the strands can vary to a large extent, for example from 3 to 30 µm and preferably from 5 to 20 µm. In the same way, wide variations can occur in the linear density of the strand, which can range from 10 to 100 tex and preferably from 20 to 50 tex.

The glass strand can be bare or provided with a layer based on a polymer, preferably of the same chemical nature as the polymer of the coating layer comprising the silane of formula (I) in accordance with the invention.

The glass strand of the invention is obtained by applying said coating composition to the abovementioned glass strand by any means known to a person skilled in the art, for example by impregnation (dip coating), in particular by passing through a bushing or in a bath, or extrusion. Preferably, application is carried out by passing through a bushing, the strand being passed through a loop fed with the coating composition and then through a heated chamber, the strand being finally collected in the form of a package. The temperature of the chamber varies according to the nature of the polymer used: it is greater than the softening temperature of the polymer and in any case is far below the decomposition temperature of the polymer. In the case of polyvinyl chloride, the temperature varies from 100 to 250° C.

The glass strand obtained is used to manufacture screens in the form of grids, woven fabrics or knitted fabrics which can be used in particular as mosquito nets.

Conventionally, the grids are formed by superimposing a first web of parallel glass strands oriented in one direction and a second web of parallel glass strands oriented in another direction, preferably in directions forming an angle generally of the order of 90°.

The woven fabrics and knitted fabrics of glass strands can be obtained by any method known to a person skilled in the art.

The grids, woven fabrics and knitted fabrics are subsequently subjected to a heat treatment which is targeted and adhesively bonding the strands at their contact or intersection points at consequently at strengthening the grid. The temperature of the treatment varies according to the nature of the polymer, greater than the softening temperature and lower than the decomposition temperature of the polymer. For polyvinyl chloride, the temperature varies from 100 to 250° C.

If appropriate, an additional layer can be applied to the grid, woven fabric or knitted fabric from a sol/gel as mentioned above. The sol/gel can be applied by impregnation, spraying, with a roller or with a curtain, followed by a stage of heat treatment, for example in a hot air chamber or under one or more infrared radiation lamps.

The grids, woven fabrics and knitted fabrics incorporating the glass strands according to the invention have a weight per unit area which varies to a large extent, for example from 50 to 300 $g/m^2$ and preferably from 70 to 200 $g/m^2$.

The screen in accordance with the invention can be used as mosquito net but also blind or sun screen, positioned inside or outside.

The examples which follow make it possible to illustrate the invention without, however, limiting it.

EXAMPLES 1 TO 4

95 parts by weight of a PVC plastisol and 5 parts by weight of the following silane:
3-glycidoxypropyltrimethoxysilane: example 1
phenyltriethoxysilane: example 2
triethoxyfluorosilane: example 3
are poured into a container.

The PVC plastisol used comprises 66.5% by weight of PVC and 33.5% by weight of a butyl phthalate or benzyl phthalate.

The composition obtained is deposited on a glass plate using a film drawer (thickness: 200 μm) and then the plate is placed in an oven at 160° C. for 5 minutes.

Under the same conditions, a PVC composition not comprising silane (Reference) is deposited on a glass plate.

The glass plate is placed in a climate-controlled chamber (40° C.; relative humidity: 95%). 3 μl of water are deposited on the plate, maintained at ambient temperature, and the contact angle is measured after different times using a tensiometer. The measurements are collated in the following table 1.

TABLE 1

|  | Ex. 1 | Ex. 2 | Ex. 3 | Ref. |
|---|---|---|---|---|
| 0 day | 83.5 | 90.8 | 92.8 | 79.7 |
| 1 day | 55.0 | 72.5 | 58.1 | 75.0 |
| 4 days | 36.0 | 72.4 | 47.5 | 71.2 |
| 6 days | 24.7 | 66.3 | 43.8 | 68.0 |
| 11 days | — | 53.6 | 39.1 | 67.9 |
| 14 days | 19.6 | — | — | 67.7 |
| 34 days | 23.3 | — | — | 66.5 |

It is found that examples 1 to 3 according to the invention make it possible to reduce the contact angle, that is to say to have a more hydrophilic surface than the Reference.

EXAMPLES 5 AND 6 (COMPARATIVE)

a) manufacture of the screen of glass strands

A glass strand is continuously manufactured by passing a strand of E glass, with a linear density of between 30 and 35 tex, through an impregnation bath containing 95 parts by weight of PVC plastisol and 5 parts by weight of 3-glycidoxypropyltrimethoxysilane in accordance with example 1. The glass strand obtained has a linear density of between 85 and 90 tex and the mean thickness of the PVC coating is equal to 305 μm.

In the same way, a glass strand is manufactured using a PVC plastisol without the abovementioned silane (comparative example 6).

With the abovementioned strand, a woven fabric is manufactured which has a mean mesh opening with dimensions equal to 1000 μm×1500 μm. The woven fabric is treated in an oven at 165° C. for a time sufficient to melt the PVC and, after cooling, to fix the strands at the crossing points.

b) soiling tests on the screens

A square sample (side length of 11 cm) of the screen obtained under a) is placed at the center of an easel sloping backwards at an angle of 10° with respect to the vertical. A spray nozzle is placed 30 cm from the sample and dispenses a jet (100 ml in total) perpendicular to the surface of the sample and over the whole of said surface.

The sprayed solution is representative of the most commonly encountered soiling substances. The solution is an aqueous/alcoholic solution (water:ethanol:isopropan-2-ol ratio by volume 51:26.5:22.5) which comprises the following compounds in the concentrations below, expressed in g/l:

| | |
|---|---|
| stearic acid | 0.735 |
| adipic acid | 2.940 |
| graphite ($d_{50}$ = 2.5 μm) | 0.147 |
| calcium nitrate | 0.235 |
| copper nitrate | 0.044 |
| zinc nitrate | 0.044 |
| potassium sulfate | 0.117 |
| sodium sulfate | 0.088 |
| calcium sulfate | 0.088 |
| sodium chloride | 0.088 |

6 measurement regions (square with a side length of 4 cm each) are defined on each screen sample, on each region is measured the surface area corresponding to the opening of the meshes before and after the soiling test. The measurement is carried out using Fourier transform image processing, which operates by counting the white pixels (clean surface) and the black pixels (soiled surface). The test is carried out on 5 samples.

The loss in transparency, as a percentage, is calculated as follows:

(number of black pixels/total number of pixels)×100

The results are as follows:

| | Ex. 5 | Ex. 6 (comp.) |
|---|---|---|
| Loss in transparency (%) | 4.8 | 23.8 |

The invention claimed is:

1. A glass strand composed of a multitude of glass filaments coated with a size before assembling together in the strand, wherein the glass strand comprises a coating layer comprising a mixture comprising
   a polymer selected from the group consisting of a vinyl acetate/vinyl chloride copolymer, polyvinyl chloride, and polyvinylidene chloride; and
   a silane of formula (I):

wherein:
$R_1$, $R_2$, and $R_3$, are each independently a $C_1$-$C_6$ alkyl group, a $C_2$-$C_6$ alkenyl group, a $C_2$-$C_6$ alkynyl group, a $C_6$-$C_{10}$ aryl group, a hydroxyl group, a $C_1$-$C_6$ alkoxy group, a $C_6$-$C_{10}$ aryloxy group, a $C_1$-$C_6$ acyloxy group, or a $C_2$-$C_7$ alkylcarbonyl group, provided that at least two of the $R_1$, $R_2$, and $R_3$ groups are a hydroxyl group or an alkoxy group; and $R_4$ is a group comprising at least one epoxy functional group, an optionally substituted aryl group, a halogen atom or a group carrying at least one halogen atom, a group comprising at least one aldehyde functional group, a group carrying at least one functional group comprising a sulfur or phosphorus atom, an acryloyloxy or methacryloyloxy group, wherein said group carrying the abovementioned functional groups is a $C_1$-$C_{18}$, carbon-comprising group optionally comprising at least one oxygen or sulfur heteroatom.

2. The strand of claim 1, wherein, in formula (I), the $R_1$, $R_2$, and $R_3$ groups are each independently a methyl, ethyl, methoxy, or ethoxy group.

3. The strand as of claim 1, wherein the formula (I), the $R_4$ group is a group carrying at least one epoxy functional group in the end position, an aryl group, a halogen atom or an aliphatic chain comprising from 1 to 9 carbon atoms carrying at least one halogen atom.

4. The strand of claim 1, wherein the silane of formula (I) is 3-glycidoxypropylmethyldimethoxysilane, 3-glycidoxypropyltrimethoxysilane, phenyltriethoxysilane, or triethoxyfluorosilane.

5. The strand of claim 1, wherein the polymer is a thermoplastic polymer optionally having an elastomeric nature.

6. The strand of claim 1, wherein the coating layer further comprises a plasticizer selected from the group consisting of an organic acid ester, a phosphate, and an oil resulting from a petroleum fraction.

7. The strand of claim 1, further comprising an additional layer, which is superimposed on the polymer layer, and selected from the group consisting of a photocatalytic layer, an antistatic layer, a hydrophilic layer, and a hydrophobic and/or an oleophobic layer.

8. The strand of claim 7, wherein the additional layer is a photocatalytic layer comprising $TiO_2$ particles in anatase form.

9. The strand of claim 7, wherein the additional layer is an antistatic layer and the antistatic layer is an ITO layer, an $SnO_2$ layer doped with a metal, a ZnO layer optionally doped with Sn, Al, In, Y, Zr, or B, or a layer comprising a UV-crosslinkable or heat-crosslinkable polymer matrix comprising ITO nanoparticles.

10. The strand of claim 7, wherein the additional layer is a hydrophilic layer comprising silica.

11. The strand of claim 7, wherein the additional layer is a hydrophobic and/or an oleophobic layer comprising a matrix, in the form of a layer or of beads, of silica grafted with fluorinated compounds, alkylsilanes, arylsilanes, or hexaalkyldisilazanes.

12. The strand of claim 1, wherein the amount of the polymer deposited on the glass strand is from 15 to 80% of the total weight of the coated strand.

13. The strand of claim 1, wherein the amount of silane deposited on the glass strand is from 0.5 to 15% of the total weight of the coated strand.

14. A screen in the form of a grid, woven fabric, or knitted fabric, comprising the glass strand of claim 1.

15. The screen of claim 14, having a weight per unit area which varies from 50 to 300 $g/m^2$.

16. A mosquito net, blind, or sun screen, comprising the screen of claim 14.

17. The strand of claim 8, wherein the $TiO_2$ particles in anatase form are in a matrix of mesoporous silica.

18. The strand of claim 12, wherein the amount of the polymer deposited on the glass strand is from 50 to 70% of the total weight of the coated strand.

19. The strand of claim 13, wherein the amount of silane deposited on the glass strand is from 1 to 10% of the total weight of the coated strand.

20. The strand of claim 1, wherein the amount of the polymer deposited on the glass strand is from 55 to 65% of the total weight of the coated strand, and the amount of silane deposited on the glass strand is from 3 to 7% of the total weight of the coated strand.

* * * * *